March 30, 1965 — C. KOCH — 3,175,480
PHOTOGRAPHIC CAMERA DIAPHRAGM
Filed Nov. 2, 1962 — 5 Sheets-Sheet 1
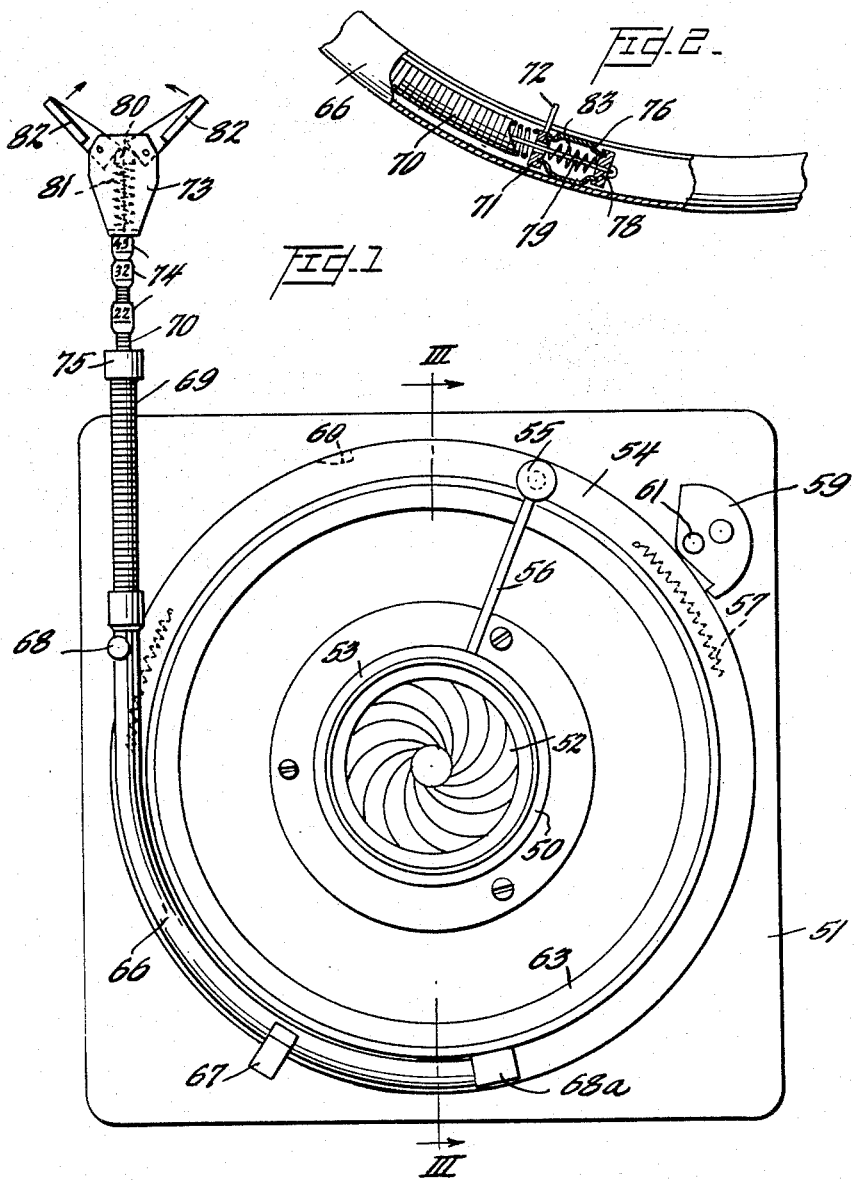
INVENTOR
Carl Koch,
BY Watson, Cole, Grindle & Watson
ATTORNEYS

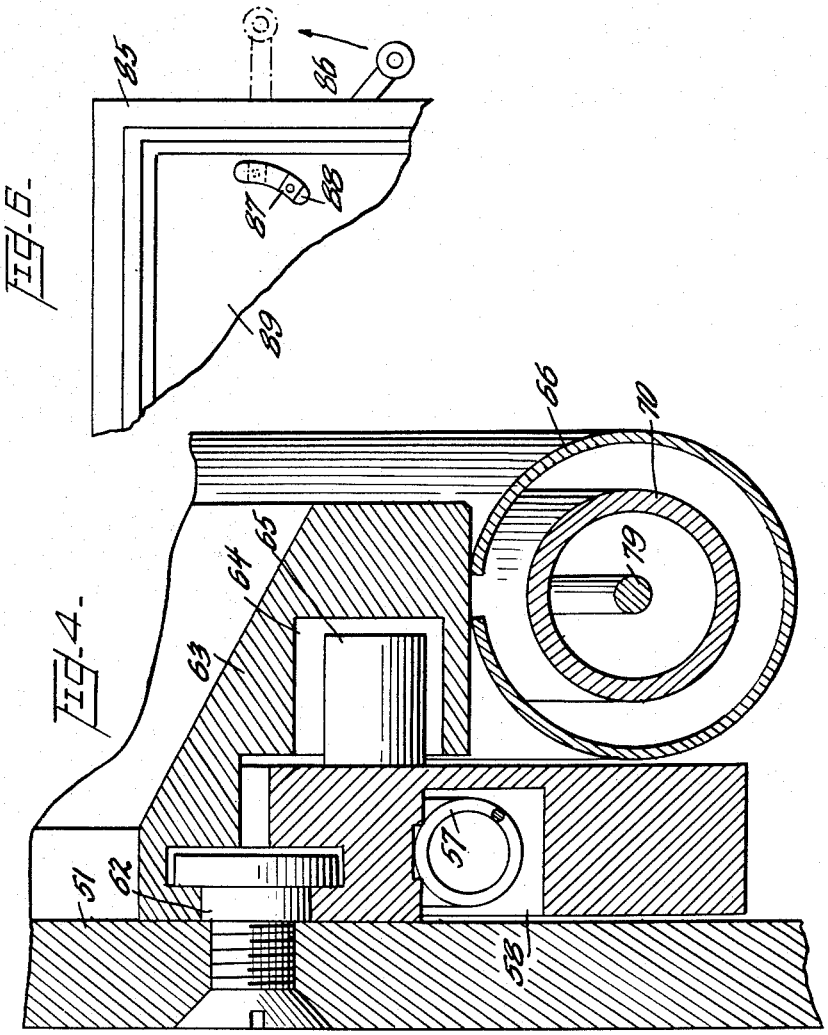

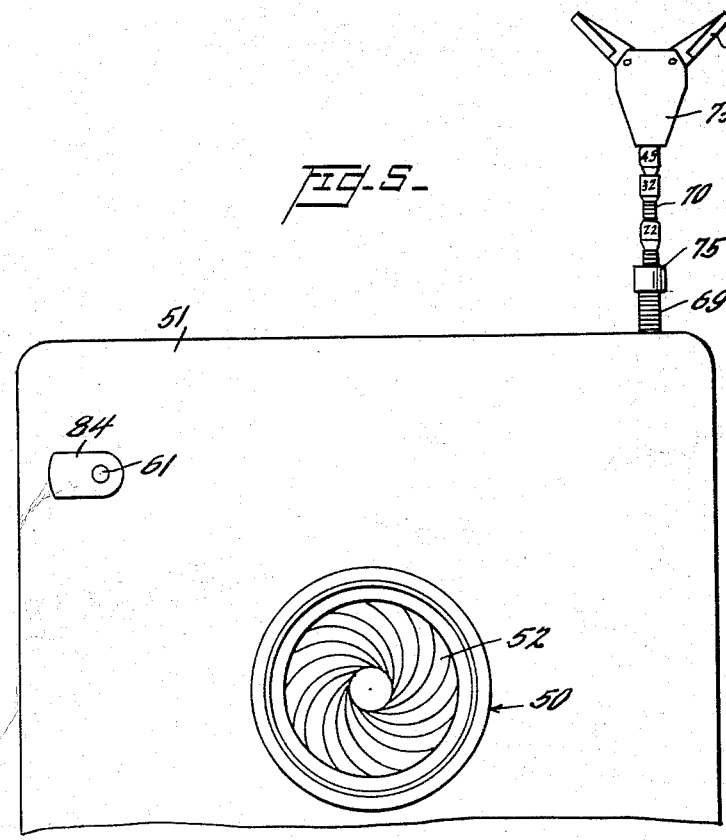
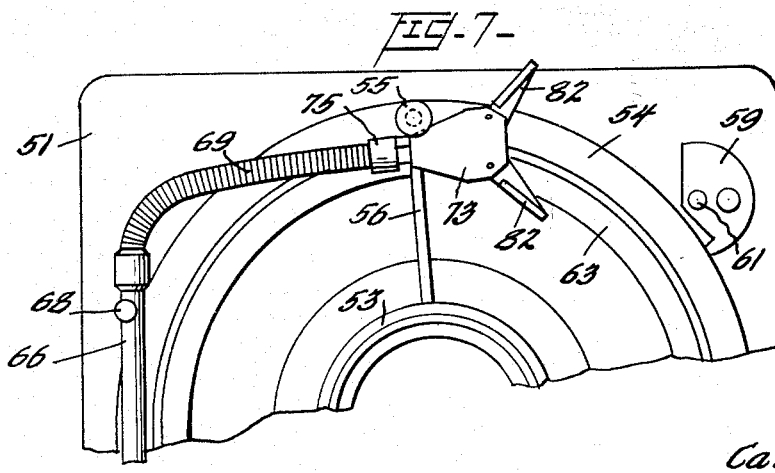

March 30, 1965 C. KOCH 3,175,480
PHOTOGRAPHIC CAMERA DIAPHRAGM
Filed Nov. 2, 1962 5 Sheets-Sheet 4
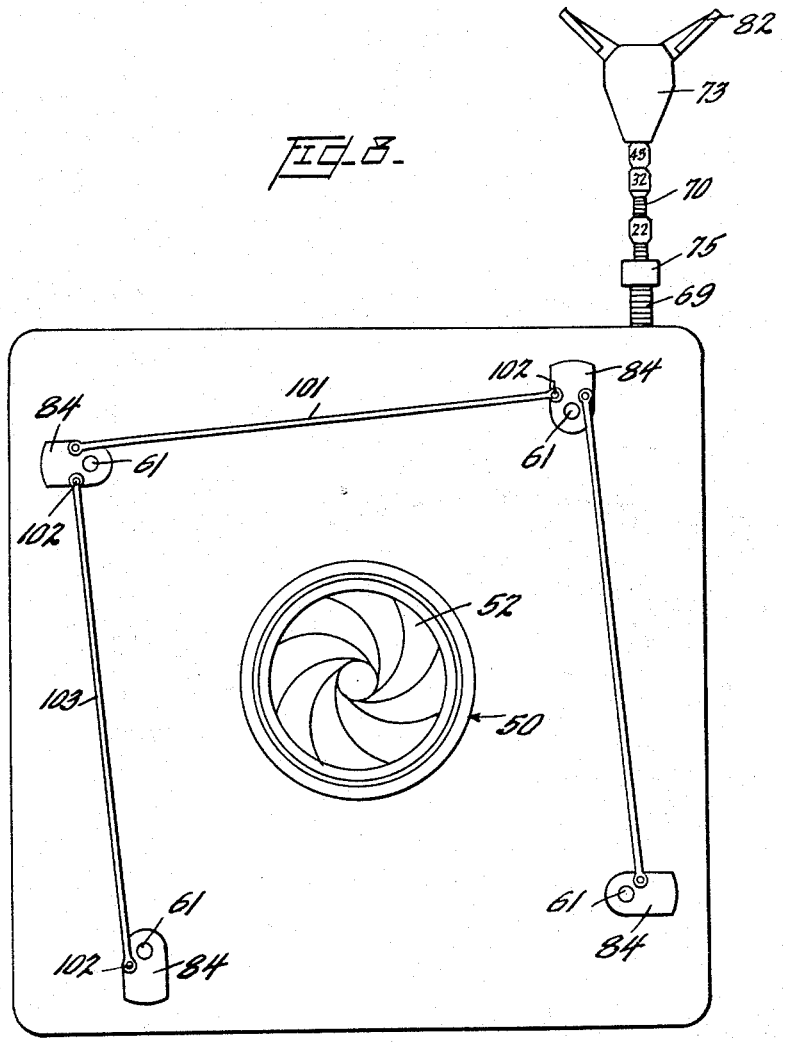
INVENTOR.
Carl Koch,
BY Watson, Cole, Grindle & Watson
ATTORNEYS

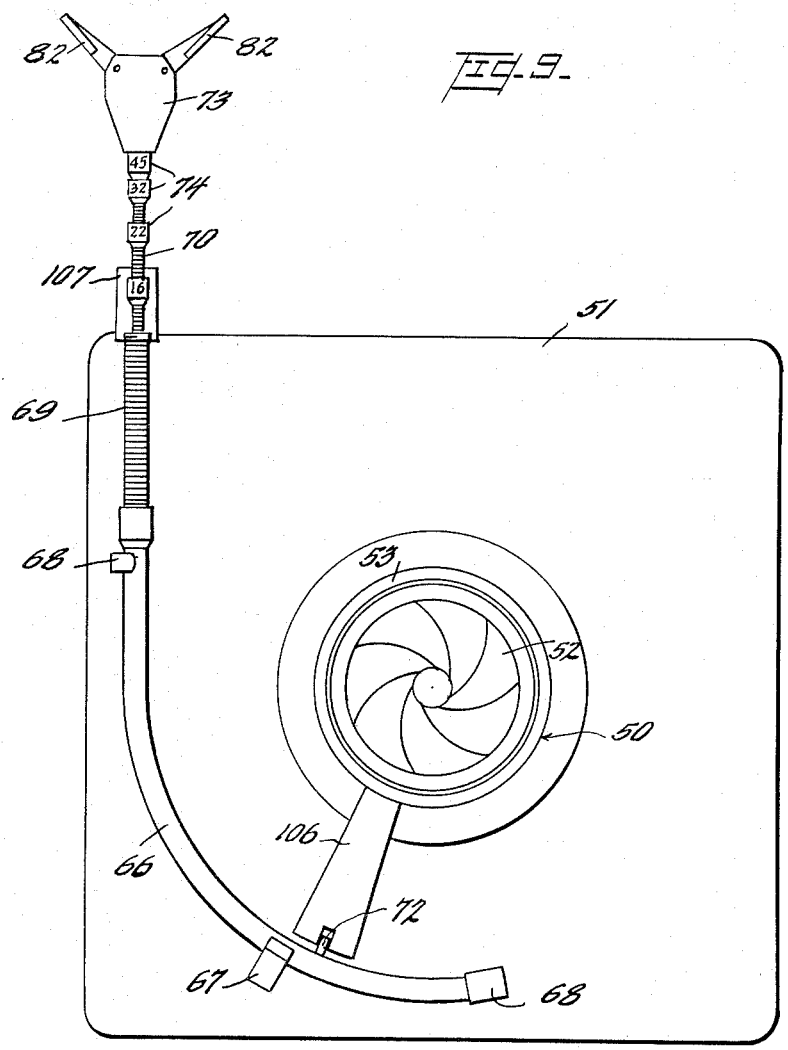

United States Patent Office 3,175,480
Patented Mar. 30, 1965

3,175,480
PHOTOGRAPHIC CAMERA DIAPHRAGM
Carl Koch, Vordersteig 2, Schaffhausen, Switzerland
Filed Nov. 2, 1962, Ser. No. 235,083
Claims priority, application Switzerland, Nov. 3, 1961,
12,804/61
11 Claims. (Cl. 95—64)

This invention relates to a photographic camera, in particular large-size camera, whose lens support carries one of various lenses with an iris which is adjustable by turning the diaphragm control ring pertaining to the lens.

The camera according to the invention is principally characterized by a manually operable setting member which is movable arranged on the lens support or carrier, coupled to the diaphragm control ring, projects beyond the edge of the lens carrier and has several scale marks to indicate the diaphragm aperture set in the lens, the scale marks being readable from various viewing directions with respect to the releated index.

The main feature of the camera according to the invention consists in that the aperture, whenever set by means of the scale marks and index, is distinctly visible and readable from different sides of the camera, especially also if the lens has mounted in front of it a mat box which hides the lens from view. In such a case, by the setting member according to the invention, setting of the diaphragm is also possible, without the mat box needing to be removed. Another essential advantage of the invention is that the same diaphragm setting device is usable for lenses of different diameters, and this appreciably simplifies and rationalizes manufacture and stocking.

Further features and details of the invention will appear from the following description and claims, taken in conjunction with the accompanying drawing, wherein there is shown, purely by way of example, one preferred form of embodiment incorporating the invention.

In said annexed drawing:

FIG. 1 shows in front view a lens carrier intended for a universal camera, with the parts arranged thereon;

FIG. 2 shows in section a detail of FIG. 1, on a larger scale;

FIG. 3 is a sectional view taken on the line III—III of FIG. 1;

FIG. 4 shows a detail of FIG. 3 on a larger scale;

FIG. 5 shows a rear view of the parts shown in FIG. 1;

FIG. 6 shows in front view a part of the lens standard of the camera with a device for opening and closing the shutter (not shown) by hand;

FIG. 7 shows a part-view similar to FIG. 1 in one position of the parts when the camera is not in use;

FIG. 8 is a rear view of a lens carrier showing a modified structure; and

FIG. 9 is a front view of a lens carrier of another modified structure.

Referring to FIGS. 1, 3 and 5, a lens 50 is mounted in the center of a square lens carrier 51 which is detachably and exchangeably fixed in the usual manner on the lens standard of a universal camera. The lens 50 has an adjustable iris 52 whose blades can be set by turning a diaphragm control ring 53.

Rotatably mounted on the front side of the lens carrier 51 is a second ring 54 whose diameter is much larger than that of the diaphragm control ring 53 at the lens 50. Said ring 54 is coaxially arranged to the lens 50 and has a forwardly projecting pin 55 which is coupled to the control ring 53 by means of a lever 56. In a peripheral groove 58 of ring 54, open towards the lens carrier, there is a spiral tension spring 57 (FIGS. 1, 3 and 4) which with one end is connected to the lens carrier 51 and with the other end to the ring 54. Said spring 57 tend to turn the rings 54 and 53 (in FIG. 1) anticlockwise and thus to close the diaphragm 52.

By means of a pawl 59 the ring 54 can, however, be locked in the position in which the diaphragm 52 is wide open. For this purpose, the ring 54 has a notch 60 which the nose of pawl 59 can engage. Pawl 59 is seated on an axle 61 rotatably mounted on lens carrier 51 and is influenced by a torsion spring (not visible) which tends to bring the pawl into engagement with the notch 60. Pawl 59 may also be actuated by hand against the action of the torsion spring, if the ring 54 has to be released.

Positioned direct within the ring 54 there is a third ring 63 which serves as diaphragm preselector ring and is likewise rotatably arranged coaxial to lens 50. According to FIGS. 3 and 4, the diaphragm preselector ring 63 engages partly over the second ring 54 and has a groove 64 running in the peripheral direction and open towards ring 54, and with one end forming a stop cooperative with a pin 65 of said second ring 54 and serving as counter-stop, if the pawl 59 is disengaged from notch 60 and the ring 54 can turn under the influence of spring 57.

According to FIG. 4, the two rings 54 and 63 are rotatably guided and secured on the lens carrier 51 by three identical guide bolts 62 which are common to both rings. The guide bolts 62, one only is shown in FIG. 4, project into a space between the two rings 54 and 63 and possess each a head which engages an inner peripheral groove of ring 54 and an outer peripheral groove of ring 63. Since the inner ring 63 engages over the outer one, the space with the guide bolts 62 therein is hidden from view.

Round a part of the periphery of the diaphragm preselector ring 63 a tube 66 is laid which, by means of holders 67 and 68, is attached to the lens carrier 51 and has, at its side facing ring 63, a longitudinal slot. One end of said tube 66 is closed by a cap 68a, while the other end is connected to a flexible tube 69. Rigid tube 66 and flexible tube 69 together constitute a guide tube for a flexible rod 70 which is mounted for endwise displacement therein and has in its longitudinal direction a continuous recess. One end of said rod 70 always lies within the rigid tube 66 and is provided with an end flange 71 (FIG. 2) which carries a radially extending driving pin 72. The latter projects through the longitudinal slot of tube 66 and engages a radial bore in the diaphragm presetting ring 63, the rod 70 being thereby coupled to ring 63. It is thus possible, by pulling or pushing the end of the flexible rod 70 projecting out of the guide tube 66, 69, to turn the diaphragm preselector ring 63. Said end of rod 70 carries a hollow handle 73.

The movability of the flexible rod 70 and preselector ring 63 in the sense of opening the diaphragm 52 is limited in such a way that the ring 54 must still be turned somewhat further by hand, until the pawl 59 engages the notch 60. Therefore, when actuating the diaphragm by displacing the rod 70, the diaphragm can never be locked in its open position.

The rod 70 has mounted thereon several small sleeves 74 which can be pushed into the guide tube 66, 69. In each of said sleeves there is a fine peripheral groove which serves as a scale division. The outer axial end face of a nipple 75 serves as the related index mark, which is seated on the free end of the flexible tube 69. If the peripheral groove of the sleeve 74 disposed nearest the handle 73 is set into the plane of the outer face of nipple 75, this corresponds for instance to a relative diaphragm aperture $f{:}45$ when pawl 59 is disengaged from ring 54. The peripheral grooves of the next following sleeves 74 indicate relative apertures $f{:}32$, $f{:}22$, $f{:}16$ and so forth. The sleeves 74 are lettered correspondingly, each diaphragm number being given at least twice on the periphery of the respective sleeve so as to be readable from all sides.

Preferably, each of the sleeves 74 is of a different color, so that the photographer can at once see the set diaphragm aperture, even without reading the diaphragm number. Instead of the sleeves 74, their letterings and scale marks could also be colored different from each other.

Advantageously, the nipple 75 having the index mark is axially adjustable within certain limits at the tube 69 to permit of corrections being conveniently made in the aperture setting. Such a correction, for instance, is desirable when changing over from F-diaphragm values to T-diaphragm values, or when using very short exposure times.

In a modified form the nipple 75 is extended axially and made of transparent material, in order that the photographer can still see a sleeve 74 lying within the nipple, thus facilitating the setting of intermediate values of the diaphragm aperture.

In order to ensure the momentary set position of the diaphragm ring 63 against accidental change, the flexible rod 70 is provided with a braking device which cooperates with the tube 66. One end of a flexible sleeve 76 is supported against the end flange 71, while the other end is held by a plate 78. The plate 78 has anchored thereto one end of a flexible pulling member 79, say a wire cable, which passes through sleeve 76, end flange 71 and the whole flexible rod 70. The other end of the cable 79 carries a head 80 which, together with a compression spring 81 encircling the cable, is arranged in the interior of the hollow handle 73. Spring 81 serves as a braking spring and tends to tighten the cable 79 and to displace it in such a way that the sleeve 76 is upset in its longitudinal direction and therefore bulges out like a barrel and rests against the inner surface of tube 66, whereby the desired braking action takes place. The handle 73 includes two swivable wings 82 which can be taken hold of by two fingers of one hand and swung towards each other. A portion of each wing 82 arranged within the cavity of handle 73 cooperates with head 80 in order to be able to displace same, together with cable 79, against the action of the braking spring 81. Moreover, between end flange 71 and plate 78 in the interior of the sleeve 76, a compression spring 83 is located which tends to stretch said sleeve, but develops less pressing force than the braking spring 81.

At the back of the lens carrier 51 according to FIG. 5, the axle 61 of pawl 59 carries a lever 84. The lens standard 85 (FIG. 6) of the camera has in known manner arranged thereon the lens shutter with the associated mechanism (of which only a lever 86 is shown in FIG. 6), this lever serving for opening the shutter to view the image on the ground-glass, and for closing the shutter before making an exposure. The lever 86 carries a forwardly projecting pin 87 which protrudes through a slot 88 in the cover plate 89 of the shutter and can cooperate with lever 84, if the lens carrier 51 is properly mounted on standard 85. In its longitudinal direction, pin 87 is displaceably arranged on lever 86 against the action of a spring (not visible). When mounting the lens panel 51, the position of lever 86 need therefore not be taken into account, since pin 87 recedes if lever 84 is pushed axially towards pin 87.

The modus operandi of the disclosed diaphragm setting device is as follows:

With pawl 59 disengaged from notch 60, the irises 52 can be adjusted by means of handle 73. Therefore the two wings 82 are taken between the thumb and index fingers of the operating hand and swung towards each other, whereby the head 80 is pressed down against the influence of the braking spring 81. Thus cable 79 is relieved of tension and the spring 83 permits of stretching the sleeve 76 so that it can be moved lengthwise within tube 66 and the brake is released. In the relative swung position of the wings 82, the flexible rod 70 can be moved lengthwise within the guide tube 66, 69, which causes the diaphragm presetting ring 63 to turn. By one end of the groove 64 serving as stop in the diaphragm ring 63, and by the pin 65 of ring 54, serving as counterstop, ring 54 is turned accordingly and thus the diaphragm 52 is set by means of lever 56 and control ring 53. Thereby spring 57 keeps pin 65 in contact with the stop of the preselector ring 63.

The setting of the diaphragm and the reading of the relative aperture may be made from any side, in particular from the side with the ground glass of the camera, and even if a mat box (not shown) is mounted in front of the lens 50 or if, in case of an exceptional standpoint of the camera, the lens side thereof is not accessible. Reading of the aperture is effected by means of the sleeves 74 relative to the end face of the nipple 75. When the wings 82 are released, the braking spring 81 draws cable 79 towards handle 73, whereby the flexible sleeve 76 is upset and is pressed against the inner surface of tube 86 for the purpose of braking the preselector ring 63 in the set position.

If it is required, in addition to viewing the ground glass with opened shutter, i.e. in the full-line position of lever 86 shown in FIG. 6, to open the iris 52 completely, the handle 73, flexible rod 70 and diaphragm preselector ring 63 need not be moved. One merely swings directly the aperture setting lever 56 clockwise by means of pin 55, whereby the rings 54 and 53 are turned in the same sense. With diaphragm 52 wide open, the nose of pawl 59 engages notch 60 of ring 54, whereby diaphragm 52 is locked in its open position. The ground glass image then has the greatest possible brightness and may therefore be judged more easily. Prior to making an exposure, lever 86 is brought into the chain-dotted position according to FIG. 6, thus closing the lens shutter. At the same time pin 87 of lever 86 presses sideways against lever 84 at the lens carrier 51 so as to disengage pawl 59 from notch 60. Now ring 54 is automatically turned by means of spring 57 until the pin 65 comes against one end of groove 64. Since the diaphragm preselector ring 63 is secured from rotating by the sleeve 76, ring 54 remains in the position as determined by the ring 63. By turning ring 54, the diaphragm 52 has been closed to the already preselected aperture setting. Therefore the exposure may be made. Closing of the diaphragm to the desired setting occurs when closing the camera shutter, not just on releasing the same when making the exposure.

The diaphragm setting may also be selected when the iris 52 is locked in its wide-open position by means of pawl 59. If desired, pawl 59 may be disengaged from the notch 60 in ring 54 direct by hand, i.e. not by means of lever 86 and its pin 87 so that, say, for controlling the depth of field on the ground glass, the diaphragm may be closed to the desired size of aperture, while the shutter shall remain open.

Since the lens carrier 51 is square, it may be brought selectively into four different positions at the lens standard 85 of the camera. This has the advantage that the end of the flexible rod 70 projecting from the tubular guide 66, 69 and carrying the handle 73, can be oriented selectively upwards or downwards, to the left or to the right, just where most suitable. But in the form of embodiment shown, lever 86 is only coupled to pawl 59 in one of these positions of the lens carrier, for which reason, in the other positions of the lens carrier 51 the pawl 59 must always be disengaged direct by hand. In manufacture it is, however, readily possible to have the pawl 59 mounted at any desired position of the square lens carrier 51, so that the handle 73 for diaphragm preselecting is usually pointing in the desired direction (upwards, downwards, to the left or to the right). Moreover, the axle 61 with pawl 59 and lever 84 may be dismountable, and the lens carrier 51 may have in each corner a prepared bearing-bore for the axle 61, in order that the pawl may each time be mounted selectively in the corner, where one wishes to have it. Thereby the ring 54 is provided with four notches 60 which are displaced 90° to one another. Pawl 59 may then collaborate in any position with one of said notches.

In a modified form, FIG. 8, in each corner of the lens carrier 51 there is provided a pivotal lever 84, and these levers are coupled to each other by simple linkages so that, when the shutter is closed by means of lever 86, pawl 59 is actuated automatically, no matter in what position the lens carrier 50 is mounted on the standard 85.

In FIG. 8, the same reference numerals are used as in FIG. 5, for identical parts. In each corner of the lens carrier 51 there is provided a pivotal lever 84, and these levers are coupled to each other by means of three linkages 101 which are connected to the levers 84 by means of pins 102. In what position the lens carrier 51 is ever mounted on the standard 85, one of the levers 84 is always in the region of the pin 87 of lever 86. When the shutter of the camera is closed by means of lever 86 the adjacent lever 84 and through the linkages 101 also the other levers 84 are actuated. The pawl 59 fixed on the axle 61 of one of the levers 84 is then automatically actuated, no matter in what position the lens carrier is mounted on the standard 85.

When stowing the camera away, or even only the lens carrier 51 with the parts mounted thereon, the flexible tube 69 and the flexible rod 70 may be bent over and hung on pin 55, as illustrated in FIG. 7. In this position, the tube 69, rod 70 and handle 73 require no additional space.

The described camera has not only the advantage that the aperture can be conveniently set and read from several sides. Another important feature is that by the sleeve 74 the preselector ring 63 in any position is secured against turning, hence also between the consecutive scale marks at the sleeves 74, in contrast to solutions with notches well known heretofore. Moreover, the brake is operated automatically when the wings 82 are released.

Another merit is seen in that the means for preselecting and setting the diaphragm may be used unchanged for a large number of different lenses. In fact, within the preselector ring 64, various lenses of different focus and different diameter may be mounted as desired. Such changing may be done by the user of the camera, provided that in all these lenses the ring 53 serving to set the diaphragm blades must be turned through the same angular amounts and in the same sense, so that the scale marks on all sleeves 74 apply unchanged to all these lenses. Under certain circumstances only the aperture setting lever 56 must be changed along with the lens. There are, however, numerous lenses with different optical properties and of identical outer mechanical design and dimensions, so that even a change of the lever 56 may be dispensed with.

In the manufacture of the diaphragm setting device, this may be adapted to any lens, quite independent of the angular division between the consecutive diaphragm values, or of the sense of turning the diaphragm control ring 53. All that is necessary is to arrange the sleeves 74 according to the scale marks on the rod 70 and to fix them finally in the proper position, which for instance may be done in a simple manner by means of an adhesive. Hence completely identical parts can always be made and used, independent of the lens to be used. This means considerable economy and simplification of manufacture over the solutions hitherto known, in which the diaphragm preselector and control device was always built together with the respective lens and had to be exchanged with it.

A simplified modification, FIG. 9, of the diaphragm setting device does not have the rings 54 and 63. Then the flexible rod 70 is direct coupled through lever 65 to the diaphragm control ring 53 of the lens 50 by means of the pin 72. For viewing the ground glass, the diaphragm 52 must then each time be opened by moving the rod 70, if it is desired to have maximum brightness of the ground glass image. Also the closing of the diaphragm to the value desired for the photograph must then be made by hand by moving the rod 70. There are further the advantages of the distinct adjustment and reading of the diaphragm setting, the advantages of the brake by means of sleeve 76 in any position of the diaphragm, and the advantages of the exchangeability of the lens, without having also to change the guide tube 66, 69 and the rod 70 with the parts connected thereto.

In FIG. 9 the same reference numerals are used as in FIG. 1, for identical elements. In contradistinction from the embodiment shown in FIG. 1, the modification according to FIG. 9 does not have any rings concentrically about the lens 50. The pin 72 attached to one end of the flexible rod 70 is directly coupled with an arm 106 projecting radially from the diaphragm control ring 53 of the lens 50 and fixed thereto. Pin 72 is engaging a slot provided at the free end of the arm 106. By moving the flexible rod 70 lengthwise in the guide tube 66, 69, the diaphragm control ring 53 is rotated and thus the aperture of diaphragm 52 changed. The nipple 75 of the embodiment shown in FIG. 1 is replaced by an axially extended nipple 107 made of transparent material, in order that the photographer can still see a scale mark carrying sleeve 74 lying within the nipple 107. The structure facilitates the setting of intermediate values of the diaphragm aperture.

There exist camera lenses which have already a diaphragm preselector device built in. Such a lens may likewise be advantageously used with the aforedescribed simplified form of the diaphragm setting device. In this case, by lever 56, the flexible rod 70 is coupled to the diaphragm preselector ring of the lens. For automatically closing the diaphragm of this lens from the wide open into the desired position before making the exposure, a suitable transmission may be fitted between pawl 59 and the corresponding release member on the lens.

What I claim is:

1. A photographic camera, in particular large-size camera, whose lens carrier carries one of various lenses with an iris which is adjustable by turning a diaphragm control ring pertaining to the lens, comprising a guide tube fixed adjacent to the lens carrier, said guide tube having an arcuate portion extending about the axis of the lens with a radius of curvature which is greater than the external radius of the largest lens to be mounted on the lens carrier, said arcuate portion of the guide tube having a longitudinal slot, a flexible rod arranged in said guide tube for longitudinal displacement, one end portion of said flexible rod projecting out of said guide tube and carrying a manually operable handle, the other end of the flexible rod being connected with a pin projecting through said longitudinal slot of the guide tube, means for detachably coupling said pin with the diaphragm control ring of the lens mounted on the lens carrier, a number of annular scale marks surrounding said flexible rod and attached thereto for indicating the diaphragm aperture set in the iris, and an annular reference means fixed to said guide tube and arranged to cooperate with said scale marks of the flexible rod, thus permitting the setting of the iris of the lens to any desired diaphragm aperture by longitudinal displacement of the flexible rod, said reference means and the end portion of the flexible rod projecting out of the guide tube, both depassing an edge of the lens carrier for being visible from the front and the back side of the camera.

2. A photographic camera as defined in claim 1, wherein the flexible rod is provided with a longitudinal recess, a flexible pulling member being disposed in said recess of the flexible rod, the flexible rod having associated therewith a braking device including a flexible elastomer sleeve which is placed within the guide tube and is mounted with one end on the flexible rod, the other end of said sleeve being connected with one end of said pulling member, a spring means arranged to upset said sleeve for producing a braking contact between the sleeve and the inner wall of said guide tube to immobilize the diaphragm control ring of the lens, said handle at one end portion of the flexible rod being provided with a movable member connected to the other end of flexible pulling member and serving for actuation of the braking device for stretching of the sleeve and releasing of the braking contact between the sleeve and the inner wall of the guide tube, thus enabling the flexible rod to be displaced for setting the diaphragm aperture in the irises.

3. A photographic camera as defined in claim 1, wherein the flexible rod is provided with a longitudinal recess, a flexible pulling member being disposed in said recess of the flexible rod, the flexible rod having associated therewith a braking device including a flexible elastomer sleeve which is placed within the guide tube and is mounted with one end on the flexible rod, the other end of said sleeve being connected with one end of said pulling member, a spring means arranged to upset one sleeve for producing a braking contact between the sleeve and the inner wall of said guide tube to immobilize the diaphragm control ring of the lens, said handle at one end portion of the flexible rod being provided with a movable member connected to the other end of said flexible pulling member and serving for actuation of the braking device for stretching of the sleeve and releasing of the braking contact between the sleeve and the inner wall of the guide tube, thus enabling the flexible rod to be displaced for setting the diaphragm aperture in the irises, said spring means is placed within a recess of said handle and arranged to tension said flexible pulling member, and a second and weaker spring being incorporated in the sleeve for stretching same when said movable member of the handle is moved for releasing the braking contact of said braking device.

4. A photographic camera as defined in claim 1, wherein the flexible rod is provided with a longitudinal recess, a flexible pulling member being disposed in said recess of the flexible rod, the flexible rod having associated therewith a braking device including a flexible elastomer sleeve which is placed within the guide tube and is mounted with one end on the flexible rod, the other end of said sleeve being connected with one end of said pulling member, a spring means arranged to upset said sleeve for producing a braking contact between the sleeve and the inner wall of said guide tube to immobilize the diaphragm control ring of the lens, said handle at one end portion of the flexible rod being provided with a movable member connected to the other end of said flexible pulling member and serving for actuation of the braking device for stretching of the sleeve and releasing of the braking contact between the sleeve and the inner wall of the guide tube, thus enabling the flexible rod to be displaced for setting the diaphragm aperture in the irises, said movable member of the handle comprising two oppositely swivable wings to be held by two fingers, and said wings cooperating with one end of the pulling member when swung toward each other.

5. Camera as defined in claim 1, wherein the flexible rod is coupled to a diaphragm preselector ring which is rotatably mounted on the lens carrier, and includes a stop cooperating with a counterstop of a diaphragm setting ring likewise rotatably mounted on said carrier, setting ring in turn is coupled to the diaphragm control ring of the lens, is under the influence of a spring tending to move the diaphragm to a closed position and capable of being locked in one end position in which the diaphragm is wide open.

6. Camera as defined in claim 1, in which a latch member is provided and wherein the flexible rod is coupled to a diaphragm preselector ring which is rotatably mounted on the lens carrier, and includes a stop cooperating with a counterstop of a diaphragm setting ring likewise rotatably mounted on said carrier, said setting ring in turn is coupled to the diaphragm control ring of the lens, is under the influence of a spring tending to move the diaphragm to a closed position and capable of being locked in one end position in which the diaphragm is wide open, the movability of the diaphragm preselector ring and flexible rod in the sense of opening the diaphragm being limited in such a way that the latch member is only capable of locking the diaphragm setting ring if the latter is manually moved still further to the wide open position of the diaphragm.

7. Camera as defined in claim 1, wherein the flexible rod is coupled to a diaphragm preselector ring which is rotatably mounted on the lens carrier, and includes a stop cooperating with a counterstop of a diaphragm setting ring likewise rotatably mounted on said carrier, said setting ring in turn is coupled to the diaphragm control ring of the lens, is under the influence of a spring tending to move the diaphragm to a closed position and capable of being locked in one end position in which the diaphragm is wide open, the diaphragm preselector ring and diaphragm setting ring being concentrically arranged round the axis of the lens and have inside diameters which are larger than the outside diameters of the biggest lens applicable to the lens carrier, said setting ring being coupled through a lever to the diaphragm control ring of the lens.

8. Camera as defined in claim 1, wherein the flexible rod is coupled to a diaphragm preselector ring which is rotatably mounted on the lens carrier, and includes a stop cooperating with a counterstop of a diaphragm setting ring likewise rotatably mounted on said carrier, said setting ring in turn is coupled to the diaphragm control ring of the lens, is under the influence of a spring tending to move the diaphragm to a closed position and capable of being locked in one end position in which the diaphragm is wide open, the diaphragm preselector ring and diaphragm setting ring being guided on and secured to the lens board by at least three common guide bolts which project into a space between said rings and have a head of each bolt engaging an inner peripheral groove in the one ring and an outer peripheral groove in the other ring.

9. Camera as defined in claim 1, wherein the flexible rod is coupled to a diaphragm preselector ring which is rotatably mounted on the lens carrier, and includes a stop cooperating with a counterstop of a diaphragm setting ring likewise rotatably mounted on said carrier, said setting ring in turn is coupled to the diaphragm control ring of the lens, is under the influence of a spring tending to move the diaphragm to a closed position and capable of being locked in one end position in which the diaphragm is wide open, the diaphragm preselector ring and diaphragm setting ring being guided on and secured to the lens board by at least three common guide bolts which project into a space between said rings and have a head of each bolt engaging an inner peripheral groove in the one ring and an outer peripheral groove in the other ring, and one of the two rings engages over the other and includes a peripherally running recess, into which projects a pin fixed on the other ring, one end of said recess and pin forming the stop and counterstop.

10. Camera as defined in claim 1, wherein the flexible rod is coupled to a diaphragm preselector ring which is rotatably mounted on the lens carrier, and includes a stop cooperating with a counterstop of a diaphragm setting ring likewise rotatably mounted on said carrier, said setting ring in turn is coupled to the diaphragm control ring of the lens, is under the influence of a spring tending to move the diaphragm to a closed position and capable of being locked in one end position in which the diaphragm is wide open, and a latch member is seated on an axle which is pivotally supported on the lens carrier and carries at the rear of said carrier a swing lever with which a member can cooperate to actuate the camera shutter.

11. Camera as defined in claim 1, wherein the lens carrier is removable, of square design and capable of being applied in four different positions for the purpose of orienting the projecting portion of the setting member in four different directions for enabling convenient setting and reading of the diaphragm aperture of the lens from all sides of the camera.

References Cited by the Examiner

UNITED STATES PATENTS

| | | | |
|---|---|---|---|
| 1,018,635 | 2/12 | Shukis | 95—64 |
| 2,334,075 | 11/43 | Davenport | 95—64 |
| 2,443,697 | 6/48 | Smith | 74—502 X |

NORTON ANSHER, *Primary Examiner.*

EMIL G. ANDERSON, *Examiner.*